C. H. DAVIS.
VACUUM MILKING MACHINE.
APPLICATION FILED JAN. 4, 1917.
1,353,639.
Patented Sept. 21, 1920.
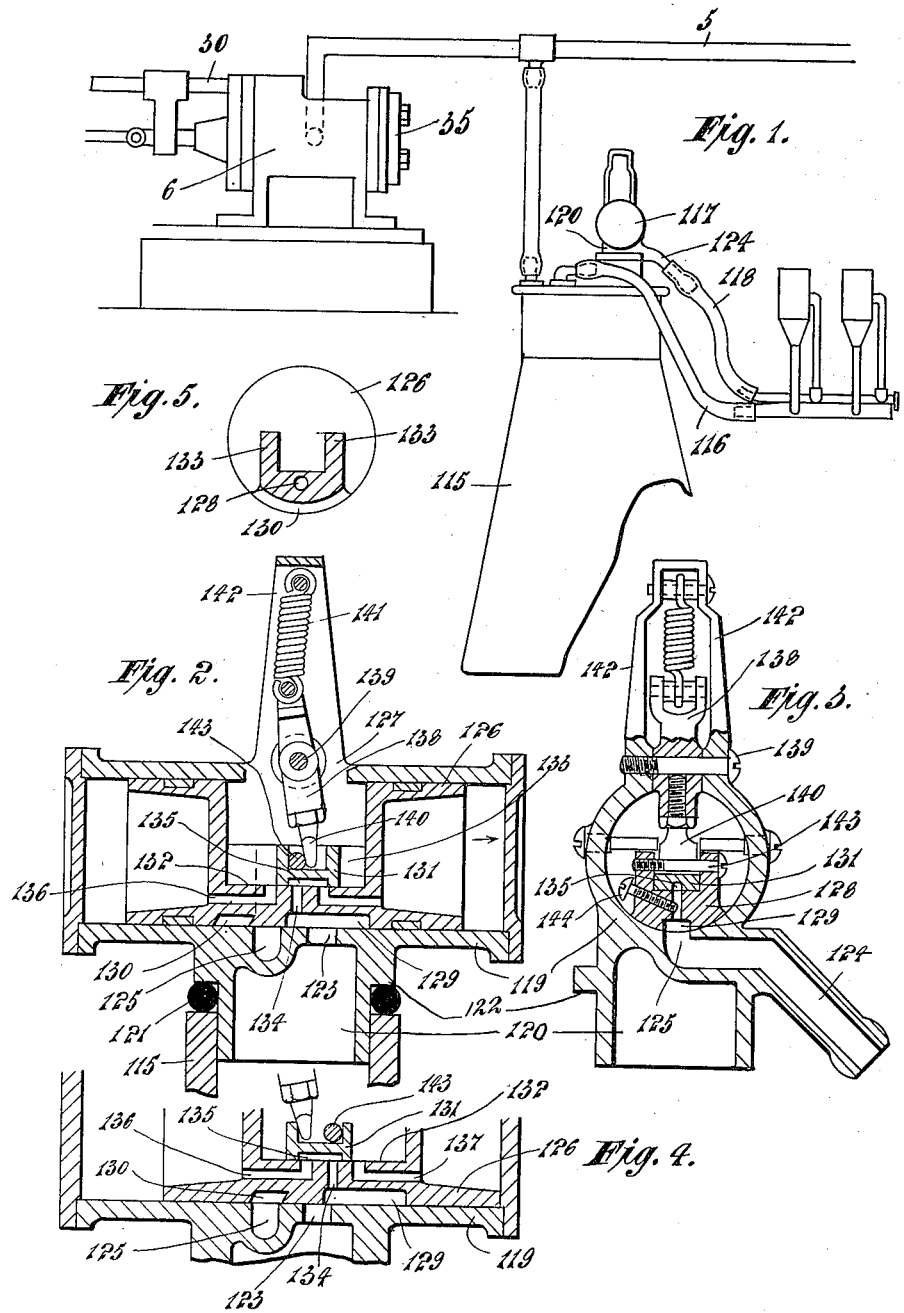
Inventor
Claude Hudson Davis.
BY: *Hvan Dedemmel*
ATTORNEY.

UNITED STATES PATENT OFFICE.

CLAUDE HUDSON DAVIS, OF WANGANUI, NEW ZEALAND.

VACUUM MILKING-MACHINE.

1,353,639.             Specification of Letters Patent.   Patented Sept. 21, 1920.

Original application filed November 11, 1915, Serial No. 60,893. Divided and this application filed January 4, 1917. Serial No. 140,569.

*To all whom it may concern:*

Be it known that I, CLAUDE HUDSON DAVIS, a subject of the King of Great Britain and Ireland, and residing at Wanganui, in the Dominion of New Zealand, have invented a new and useful Vacuum Milking-Machine; and I do hereby declare the following to be a full, clear, and exact description of the same.

The present application is a division of my application, filed November 11, 1915, and bearing the Serial Number 60893.

This invention relates to vacuum milking machines of the class wherein a separate milk receiving can is employed for each bail.

The object of the present invention is to provide a pulsator operable automatically by the vacuum in the vacuum pipe and located upon the lid of the can for the purpose of operating the teat-cups.

The invention will be described with the aid of the accompanying drawings and the novel features thereof pointed out in the claims.

On the drawings:—

Figure 1 is a view showing the method of arrangement of the pulsator upon a milk can.

Fig. 2 is a longitudinal section of the pulsator.

Fig. 3 is a cross section thereof.

Fig. 4 is a view showing the pulsator piston at one end of its stroke.

Fig. 5 is a cross sectional view of the pulsator piston.

Referring to the drawings a vacuum pipe 5 (see Fig. 1) leads from the pump 6 and extends throughout the byre.

Branch vacuum pipes lead from the pipe 5 to milk receiving cans 115 in the usual manner.

A flexible milk connection 116 leads from the can 115 to the milk portion of the claw.

An automatic pulsator 117 located upon the top of the can and in vacuum communication therewith has a flexible connection 118 leading to the vacuum portion of the teat-cup claw.

The construction of the pulsator 117 is clearly shown in Figs. 2 to 5 and comprises a cylindrical casing 119 having an integral branch 120 which forms a vacuum connection with the can 115. An air-tight joint is formed between the branch and the can by a rubber washer 121 resting between the top of the can and a shoulder 122 formed upon the branch 120. A port 123 makes communication between the interior of the branch and the interior of the cylinder.

A nipple 124 is formed upon the exterior of the cylinder (see Fig. 3) its passage ending in a port 125 leading to the interior of the cylinder. A double ended piston 126 is located within the cylinder as shown. The space between the two ends is open to the atmosphere through an opening 127 in the top of the cylinder 119. The two ends of the piston are connected by an integral portion 128. (See Fig. 3).

A longitudinal passage 129 is formed in the portion 128 and adapted to cover the port 123 with which it is always in communication.

An air passage 130 (see Figs. 2 and 5) upon the lower side of the portion 128 communicates with the space between the two piston ends and is open to the atmosphere through the same.

A slide valve 131 slides upon a valve face 132 of the portion 128 and is guided laterally by cheeks 133 integral with the portion 128.

A pin 143 passing through the cheeks limits the travel of the valve 131.

An orifice 134 leads from the passage 129 and is in constant communication with a longitudinal passage 135 formed in the under side of the slide valve. Ports 136 and 137 lead respectively from the piston ends to the valve face as clearly shown in Fig. 2.

A member 138 pivoted upon a pin 139 threaded into upwardly extending members 142 of the cylinder carries a point hardened wiper 140. The member 138 is normally retained in a vertical position by means of a coil spring 141 arranged as shown.

In Fig. 2 vacuum obtains in one end of the cylinder through the port 123, passage 129, orifice 134, passage 135, and port 137. The opposite end of the cylinder is open to the atmosphere through the port 136 and the piston therefore travels in the direction of of the arrow.

As the piston continues its stroke the point of the wiper 140 will ride over the pin 143 and by the time the piston has reached the end of its stroke (as shown in Fig. 4) the point will have left the pin 143 and be caused by the spring 141 to tend to resume its normal position carrying with it the slide valve 131 to the position clearly shown in Fig. 4. The port 136 will now be in communication with vacuum through the passage 135, orifice 134, and passage 129, while the port 137 will be open to the atmosphere, consequently the piston will commence to return. It will be readily understood that the action of the slide valve at the opposite end of the stroke is similar as above described.

As the piston moves forward in the direction of the arrow in Fig. 2 the air passage 130, will cover the port 125 and atmospheric pressure will cause the lining of the teat-cups to collapse in the usual well known manner. Upon the return stroke of the piston after the mid-position of the piston has been reached the air passage 130 will be cut off from the port 125 and the passage 129 brought into communication with the port 125. Vacuum will then obtain behind the rubber lining of the teat-cups.

A screw 144 (see Fig. 3) threaded into the portion 128 is employed to regulate the orifice 134 and thus govern the speed of the piston.

What I claim is:—

1. In a milking machine, a milk receiving can, a pulsator comprising a cylinder open at its middle portion to the air, a vacuum connection to said cylinder from said can, a double-ended piston located within said cylinder and having a space open to the atmosphere between the ends of said piston and having ports communicating with the ends thereof and a passage in communication with vacuum, a slide valve alternately admitting air and vacuum to the ends of said piston in order to cause it to reciprocate within said cylinder, and means for operating said valve upon the reciprocation of said piston.

2. In a milking machine, a milk receiving can, a pulsator comprising a cylinder open at its middle portion to the air, a vacuum connection to said cylinder from said can, a double-ended piston located within said cylinder and having a space open to the atmosphere between the ends of the piston, a valve face between the ends of said piston, a nipple from said cylinder adapted to be connected to the teat-cup linings, said piston being adapted to alternately admit vacuum and air to said nipple, said piston having a port leading to the said valve face and adapted for constant communication with said vacuum connection, ports leading from the ends of said piston to the said valve face, a slide valve controlling said ports leading to said valve face and means for operating said slide valve upon the reciprocation of the said piston, substantially as set forth.

3. In a milking machine, a milk receiving can, a pulsator comprising a cylinder open at its middle portion to the air, a vacuum connection to said cylinder from said can, a nipple from said cylinder adapted to be connected to the teat cup linings, a double-ended piston within said cylinder having a space between said ends open to the atmosphere and an air passage open to said space, said air passage adapted to intermittently admit air to the nipple leading to the teat-cup linings, said piston having ports leading to the ends thereof, a slide valve controlling said ports to admit vacuum and air alternately to the ends of the piston in order to cause it to reciprocate within said cylinder, and said piston being adapted to admit vacuum to said nipple alternately with the air, substantially as set forth.

4. In a milking machine, a milk receiving can, a pulsator comprising a cylinder open at its middle portion to the air, a vacuum connection to said cylinder from said can, a double-ended piston located within said cylinder and having a space open to the atmosphere between the ends of said piston, and having ports communicating with the ends thereof and a passage in communication with vacuum, a slide valve adapted alternately to admit air and vacuum to the ends of said piston in order to cause it to reciprocate within said cylinder, a spring operated member pivoted in said cylinder, a wiper located at the end of said member whereby the said slide valve is caused to return when said piston has completed its stroke, substantially as set forth.

5. In a milking machine, a milk receiving can, a pulsator comprising a cylinder open at its middle portion to the air, a vacuum connection to said cylinder from said milk receiving can, a double-ended piston within said cylinder having a space between the ends open to the atmosphere and a port leading from said space open to vacuum and ports between the ends of said piston and said open space, a slide valve controlling said ports and means for operating said slide valve upon the reciprocation of the piston, substantially as set forth.

In testimony whereof, I have signed my name to this specification in the presence of two subscribing witnesses.

CLAUDE HUDSON DAVIS.

Witnesses:
G. S. GORDON,
A. D. BRODIE.